(12) United States Patent
Wood

(10) Patent No.: US 6,463,257 B1
(45) Date of Patent: *Oct. 8, 2002

(54) INTERACTIVE EDUCATIONAL TOY

(75) Inventor: Michael C. Wood, Orinda, CA (US)

(73) Assignee: Knowledge Kids Enterprises, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/384,657

(22) Filed: Aug. 27, 1999

Related U.S. Application Data

(63) Continuation-in-part of application No. 09/095,492, filed on Jun. 10, 1998, now Pat. No. 5,944,533.

(51) Int. Cl.⁷ .............................. G09B 5/00; A63H 3/28
(52) U.S. Cl. ...................... 434/308; 434/335; 446/297; 446/318
(58) Field of Search .................................. 434/308, 322, 434/335, 169, 327, 393; 446/143, 268, 297, 302, 369, 368, 397

(56) References Cited

U.S. PATENT DOCUMENTS

| | | | |
|---|---|---|---|
| 3,977,292 A | * 8/1976 | Favilli et al. | |
| 5,114,376 A | * 5/1992 | Copley et al. | 446/369 |
| 5,188,533 A | 2/1993 | Wood | |
| 5,910,009 A | * 6/1999 | Leff et al. | 434/322 |
| 5,944,533 A | * 8/1999 | Wood | 434/322 |
| 6,010,339 A | * 1/2000 | McDonald | 434/258 |
| 6,021,306 A | * 2/2000 | McTaggart | 434/317 |
| 6,029,042 A | * 2/2000 | Yaron-Moallim | 434/309 |
| 6,074,212 A | * 6/2000 | Cogliano | 434/159 |
| 6,179,682 B1 | * 1/2001 | Plain | 446/141 |

OTHER PUBLICATIONS

VTech Smart Play, "Little Smart Alphabet Desk", 3 pages, 1992.
VTech Smart Play, "Video Painter", 3 pages, 1993.
VTech Smart Play, "Little Smart Number Desk", 4 pages, 1995.
VTech Little Smart Dial A Smile Manual, 6 pages, 1993.
VTech Fun to Talk Phone Manual, 5 pages, 1993.
VTech "Little Smart Number Desk" Manual, 6 pages (no date printed).
LeapFrog "Create–a–Word SuperMat" and "Create–a–Word Traveler" Manual, 2 pages, 1997.
"Classic Toys 2001: VTech Industries, Little Smart Tiny Touch Phone", <http://www.drtoy.org/drtoy/vtech_tinytouch_2001c.htm> , 1990.*

* cited by examiner

Primary Examiner—Klein T. Nguyen
Assistant Examiner—Kurt Fernstrom
(74) Attorney, Agent, or Firm—Townsend, Townsend & Crew LLP

(57) ABSTRACT

The present invention comprises a teaching toy that invites a child's interaction using an attractive play figure, for example a stuffed animal, to present more than one instructional modality in mixed formats. The child is presented with a declarative instruction, songs, and moving lights and kinesthetic and reasoning connections are induced in the child's mind via games, songs, and visual stimuli. Particularly, the present invention teaches and reinforces a child's knowledge of geometric shapes, colors, melody and rhythm by use of visual, audial, and kinesthetic involvement of the child. If the inventive is presented in the form of a stuffed animal, the exterior of the animal would have a plurality of indicia that the child could press. The indicia is electrically coupled to switching circuitry and those switches activate a logic circuit containing preprogrammed instruction modalities and play methods. The instruction modalities are communicated using a variety of preprogrammed fun speech patterns so that the toy appears to talk to the child and provide instruction. Each inventive toy presents least two distinct instruction modalities, for example, i) identifying a symbol by its shape and ii) associating a visual stimulus with a kinesthetic action.

44 Claims, 2 Drawing Sheets

INTERACTIVE EDUCATIONAL TOY

Figure 1:
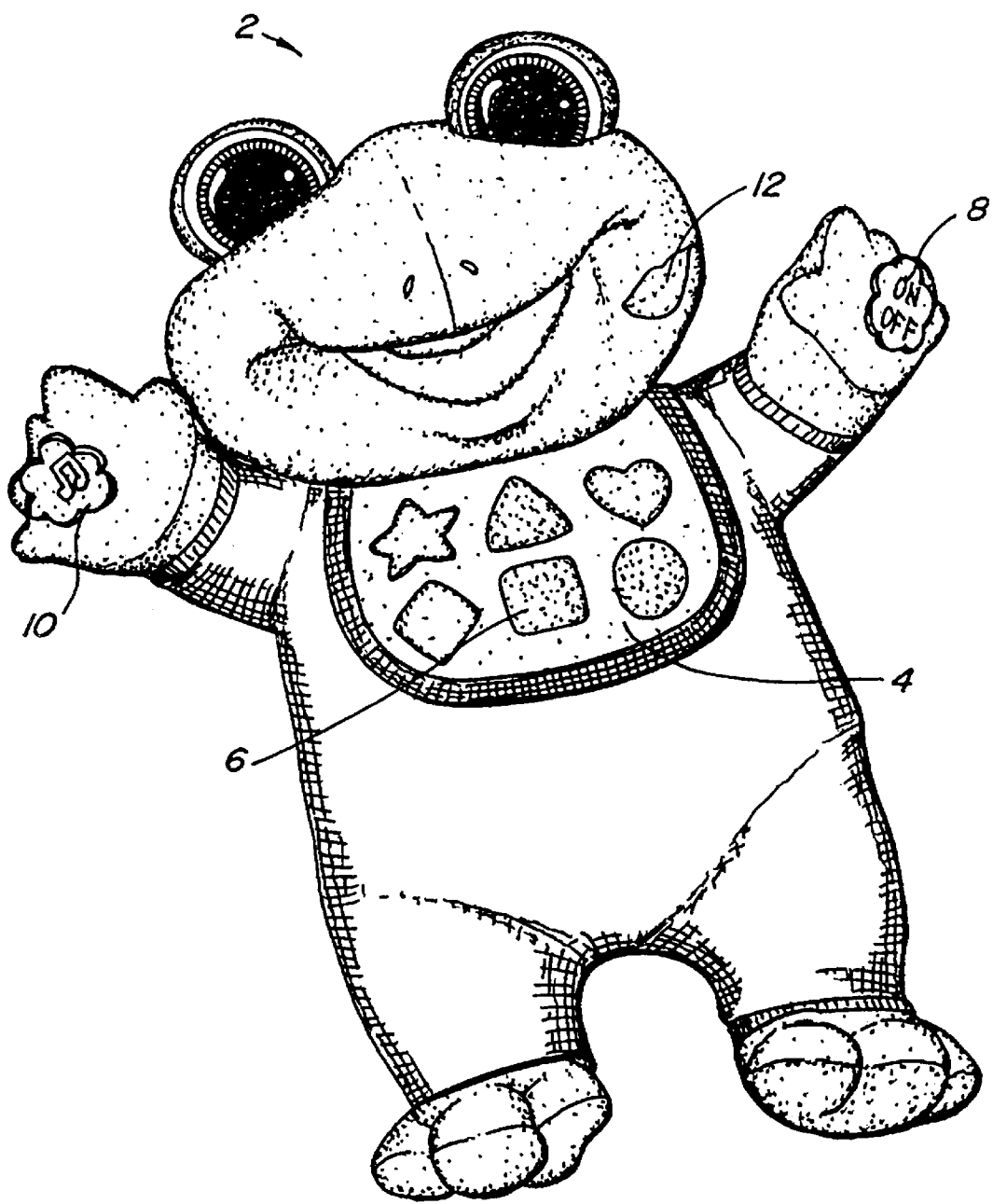

This is a continuation-in-part of U.S. application Ser. No. 09/095,492, filed on Jun. 10, 1998, now U.S. Pat. No. 5,944,533, and incorporated herein by reference.

BACKGROUND OF THE INVENTION

1. Field of the Invention

This invention relates generally to early stage learning skills and more specifically to learning colors, geometric shapes, and hand-eye coordination skills.

2. Description of Related Art

Repetition is an important teaching tool. To teach a child or toddler effectively, repetition must be made interesting and fun. There are a large number of educational toys that attempt to engage a child's interest and to teach the child any of a variety of concepts by virtue of the child's play with the toy. These toys however are geared to single format learning. Typically toys implement a particular instructional modality and use it exclusively.

For example, in U.S. Pat. No. 5,376,038, issued to Avi Arad, a doll is disclosed that has electronic switches located in the hands, feet, nose, lips, and other body parts of the doll. When a child presses the switch in, for example the hand, the doll appears to speak the word, "Hand". An adult can adjust a programming switch that changes the complexity of speech so that the doll appears to say the words, "Hold my hand" instead of only saying the word, "hand". Arad's doll, however, not only requires intervention of an adult for full operation, it operates only the format of saying a word or phrase in response to activation of a switch in a particular body part. The Arad educational toy is based on the presumption that the child will learn to associate the word with the body part in which the switch is pressed. Arad's educational toy provides the user with only a single instruction modality wherein a name is provided for a body part.

U.S. Pat. No. 5,372,511, titled "Educational Toys", by C. W. Keung discloses a two dimensional board on which objects shaped like household items, domestic pets, or letters can be placed. Sensing and switching devices on the board activate speech synthesis circuits that say the name of the object, such as "dog", "A", or the name of a number. Again in this device the format is constant. The child sets an object that is provided as part of the toy down on a sensing board, and a preprogrammed voice synthesizer provides the name the object represents. While the toy is interactive, it is presented as a tablet style learning tool, a device to be used in desk fashion instead of as a play object, and only a single instruction modality, the naming of an object, is presented.

A toy that is available on the market, titled "What Am I", a Golden Book™ product (Western Publishing Co. Inc.; 1220 Mound Ave.; Racine, Wis. 53404) presents a slightly different format. It presents the child with a 6×6 array of cartoon representations of various unrelated objects, for example, a bus, a bird, a spoon, a cake, a roller skate, etc. The child is asked to guess what object is in the 'mind' of the toy, with the voice synthesized question, "What am I?". Upon pressing a random first square, the child is told, "I am bigger than that", or "I am smaller than that", or "I am a different color", etc. The objects are functionally unrelated. It often takes users, including adults, many tries to get a correct answer, causing frustration. Also the child must have a very clear idea of what the object is before playing the game because the object representations are all the same size. In the cartoons, a house, a spoon, a cat, and an apple are all represented with the same size picture. As with the other toys, the format is invariable Only one instruction modality is presented. Additionally there are a very few number of phrases and tunes used.

SUMMARY OF THE INVENTION

Ideally, a teaching toy would provide an inviting format for interaction and would combine instruction with quizzing and logic to engage all portions of a child's interactive capability. For a toddler, a teaching toy would ideally combine instruction with kinesthetic and hand-eye coordination skills while reinforcing auditory response. Learning is best achieved when at least three physical modalities are logically connected and engaged: audio, visual, and kinesthetic. Instruction is best reinforced when both recognition and recall memory is engaged. In addition, combining declaratory instruction with rhythmic songs, direct simple quizzing or rewarding hand-eye coordination, inducing connections between action and response, and providing a social environment all serve to enhance learning. It would be very desirable to have a toy that was attractive to a child simply as a toy and that further provided instruction using a combination of presentation formats and instructional modalities. It would be further attractive to have a learning toy that targets very early learning, such as in toddlers.

It is an object of this invention to provide a teaching toy that invites a child's or toddler's interaction using more than one instructional modality in a mixed format presentation, including declarative instruction, hand-eye coordination, and induction of audial and visual connections in the child's mind via positive reinforcement through songs and visual stimuli. In addition, the educational toy is a plush animal with which the child can cuddle or have fun inventing his or her own games. It is a further object of the present invention to teach and reinforce a child's knowledge of geometric shapes, colors, song, and accurate kinesthetic involvement of the child by use of mixed instruction modalities. It is a further object of the invention to teach these concepts to toddlers of the age between about 5 months and about 48 months, or more preferably between about 9 months and about 24 months. Older children may also learn from or enjoy the inventive toy.

The present invention is an interactive learning device comprising, a) a figure attractive to children, the figure having an exterior surface; b) a plurality of indicia on the exterior surface of the figure; c) a light associated with the indicia; d) switching circuitry electrically connected to the indicia; and e) a logic circuit having at least one memory and having its input terminals connected to the switching circuitry and its output terminals connected through other circuit elements to a sound synthesizer and speaker; wherein the logic circuitry controls interaction between the switching circuitry and a plurality of preprogrammed instruction modalities including at least two distinct instruction modalities.

SUMMARY DESCRIPTION OF THE DRAWINGS

FIG. 1: illustrates one embodiment of the present invention, in the form of a plush animal, having indicia on its bib and hands and a plurality of instruction modalities in internal circuitry.

Figure 2:
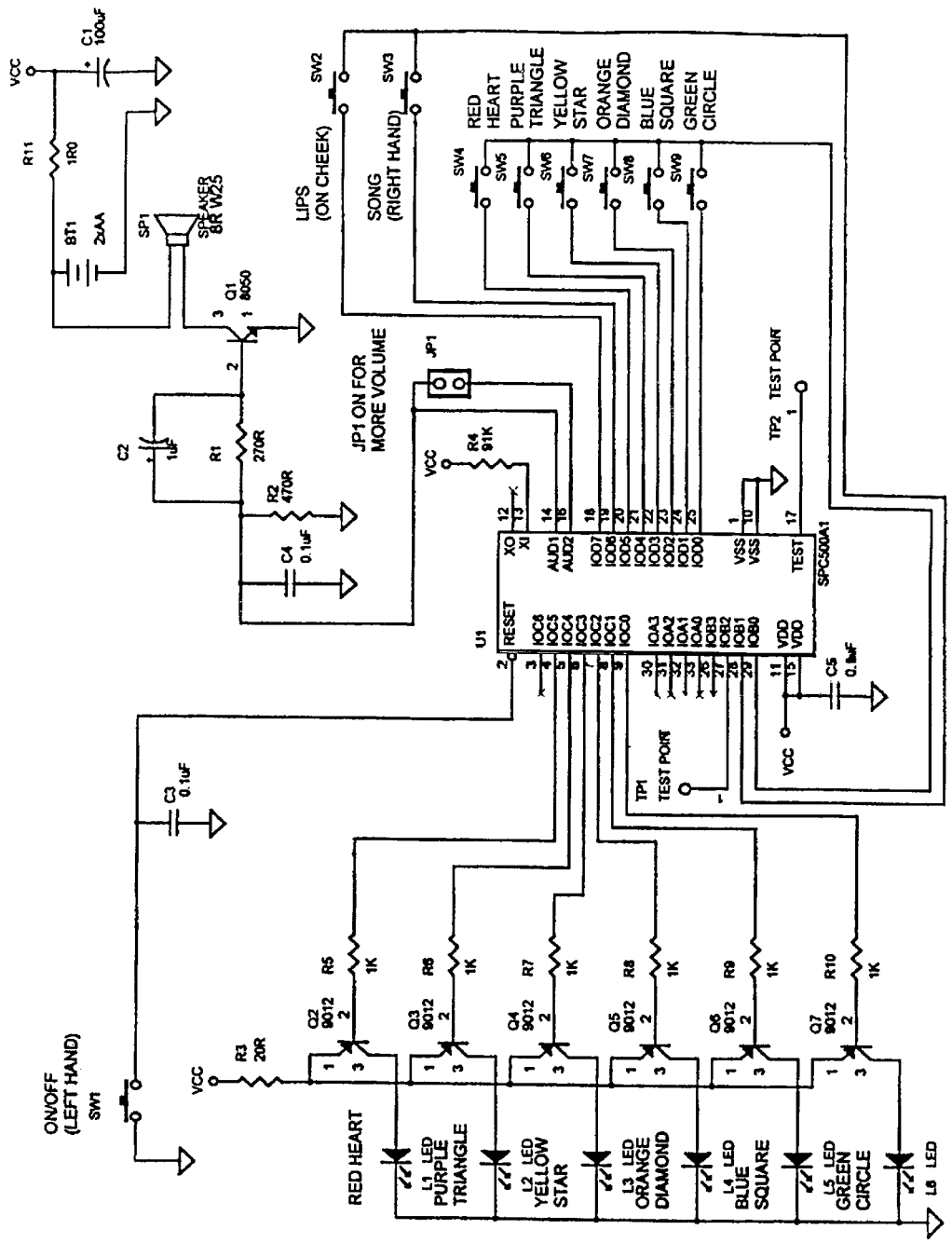

FIG. 2: is a schematic diagram of one embodiment of switch and logic circuitry that controls a plurality of preprogrammed instruction modalities.

DETAILED DESCRIPTION OF THE INVENTION

The present invention is an apparatus and method for teaching children basic symbol, and name association concepts. The name of a symbol is taught; the meaning of the symbol is taught; and a quality of the symbol is taught. The inventive learning apparatus is designed to teach these principles using audial, visual, and kinesthetic cues and by engaging the child in recognition tasks. While performing one task, that is, while engaged in playing a game that targets one learning skill, other learning skills are reinforced.

To engage the child, the apparatus is embodied in a figure that appeals to a child. The figure may be a plush figure that invites touching and feeling or a figure that holds other interest for the child. Examples of plush figures include those in the shapes of household pets, cartoon figures, human figures, or hybrid fantasy designs. Examples of other figures that may hold a child's interest include household articles like a telephone. The figures described above only provide illustrative examples and the inventive figure is not limited to these examples.

Indicia is applied to the figure in a fashion that is easy for a young child of about 6 months or 9 months or older to grasp, squeeze, or push. For example an array of indicia comprising geometric shapes may be attached to the chest of the figure. Indicia comprising colors may also be attached to the figure's bib or fingers and indicia comprising an 'On/Off' function, or song function, may be attached to the figure's palms, feet or at other locations. Additionally, function indicia that initiate different learning or play modes by activating instruction modalities would beneficially be located in an easy to reach place, for example on the chest of the figure.

A declaratory instruction modality is useful in teaching young children the names of shapes and colors. The child or toddler presses a shape and hears it's name said, or presses a color spot and hears the name of the color. To teach kinesthetic ability, a light can be located on, at, or shine adjacent to any of several shapes or color spots, or shapes having specific colors. The light may flash and appear to move from shape to shape, say from a triangle to a square, then on to a circle. If the toddler pushes the shape that has the light, he or she gets rewarded by another function initiating, for example a song may begin to play. The toddler thus learns to connect what her or his eyes are seeing with a motor function skill, such as pushing the lighted object. The toddler further learns to control the playing of song by pushing the shape with a light on it. The ability to control the toy keeps the toddler's attention and reinforces the new learning.

A note symbol is similarly advantageously taught by connecting a note indicia to a switch that produces songs when the note indicia is squeezed. Among the many educational games and toys available, none were found having two or more of the key elements. Elements key to educating a small child with a toy include, i) that the child is attracted to the toy independently of the toy's educational function, ii) that the child is engaged by more than one instructional modality, and iii) that the child can choose the modality of interest. It is best when a number of these elements are combined in a toy.

A child perceives the inventive educational toy as a toy, independently of its teaching function; the present invention combines the above-described instruction modalities and other instruction modalities to teach children the concept that a shape can be described (or named) by both its geometry and by its color. Further, by using songs, the present invention reinforces the child's kinesthetic ability and teaches that songs are represented by "note" indicia. Perceptual skills are stimulated by bright colors, flashing lights, and reward for the child connecting the flashing light with the object the child squeezes. Cognitive and memory development is developed through musical rhythms and melodies. Reasoning skills are initiated through interactive play that helps children connect action with reaction, symbols with sounds, and words with meaning. Furthermore, children develop fine motor skills as they physically choose a shape, the song indicia, or other play and learning modes such as a flashing light or "kiss" indicia. In one embodiment the toy is programed to talk to a child like a friend, and has a kiss symbol on its cheek in the form of red lips, which if pushed or squeezed, causes Baby Tad to make a kissing sound and say, "I love you".

FIG. 1 shows a diagram of one embodiment of the inventive educational toy. The figure in this embodiment is that of a plush baby frog 2. In one embodiment the frog is sized about one foot high and about one foot wide. The frog is named Baby Tad after the fact that a tadpole is a juvenile form of a frog. The toy is made from a soft colorful fabric that is pleasant to touch, and has a cuddly appearance.

Baby Tad 2 has a bib 4 that contains a 2×3 matrix on which six shapes 6 are represented using geometric indicia. Each shape is a solid color. In this embodiment six different shapes were used and six different colors were used. Each shape has a light (not shown) associated with it. At any one time the light will shine from only one shape. One of Baby Tad's palms has an 'On/Off' function indicia on it 8. The toy also has timer so that if it is not played for 20 seconds continuously, the toy says, "Bye Bye" and turns off. A musical indicia 10, for example a musical note, is located on the other palm.

In this embodiment a pressure sensitive switch is located behind each shape, or function indicia. The switches are connected to switching circuitry which in turn provides input to a logic circuit. FIG. 2 shows one embodiment of the switch and logic circuitry that activates the plurality of instructional modalities as appropriate to the child's use.

Preprogrammed instruction modalities are stored in one or more memories in the logic circuit or an associated microprocessor. Different instructional modalities are activated depending on which function indicia is pressed. If no modality is chosen, the toy defaults to the shapes on the toy's bib flashing. The art of activating different programs in memory via switching means, and driving speech chips according to the chosen program is well known by those of ordinary skill in the art of electronics for toys. The present invention does not lie in the specific implementation of the electronic circuit logic.

In the present embodiment, to begin instructive play, the figure's left hand is squeezed activating the switch behind 'on/off' indicia 8. The figure gives a pleasant giggle and says, "Hi, I'm Baby Tad. Let's sing!". The toy then begins a song. At the same time, lights located on each of the six shapes 6 on Baby Tad's bib flash in random sequence. The six shapes are a square, a triangle, a circle, a heart, a star, and a diamond. They are colored yellow, purple, red, orange, blue and green. Of course, use of these particular colors and shapes is arbitrary and a large number of other colors, shapes, or learning indicia can be used without departing from the spirit of the invention. For example a "polka dot" or "checkered" pattern could be used instead of solid colors. If the child presses a shape that is not flashing, the toy says the color and the name of the shape, for example, "Blue square", or "yellow star", or "red heart". The toy then waits for the child to press another shape, or possibly to squeeze the hand with the note symbol on it.

In a second learning modality, if the child presses the flashing shape, the toy says the color and the name of the shape, and then rewards the child with a song. At the end of every song, the shapes on the toy's bib begin to flash. If the child presses the flashing shape, Baby Tad says the color and the name of the shape and then rewards the child with a song. This teaches the child to move his or her hands in response to what was seen. The child also learns depth perception from reaching for the flashing shape, and connects the reward with an auditory signal.

In a third learning modality, if the child presses or squeezes the note indicia 10 on Baby Tad's right hand, one of a number of songs will play. If the child squeezes the right hand note indicia before the first song is finished, the next song will play, so that the toddler learns that she or he can control the sounds. At the end of the song, the shapes on the bib will flash to invite the child to press one of them.

A fourth learning modality involves pressing the lip symbol 12 on Baby Tad's cheek, which will cause Baby Tad to make a kissing sound and say, "I love you." This again teaches the child hand-eye coordination and teaches the child to control the actions of the toy, and provides an insight to social skills, relating a kiss on the cheek to fondness.

At the end of play, the toy is turned off by pressing the On/Off indicia and the figure says, "Bye, Bye!". If the child doesn't interact with the toy for several seconds, the toy says, "Pick up Baby Tad." If the child still doesn't respond, the toy will say any of several other phrases, such as "Peek-a-boo, I see you", or giving a giggle and saying, "Let's play!" If the child doesn't interact with the toy for twenty seconds, the figure turns off automatically, saying, "Bye Bye".

Table 1 shows a complete tabulation of a particular embodiment of the logical relationships between indicia activation and toy response.

TABLE 1

| FUNCTION | RECORDING | LIGHTS |
|---|---|---|
| | Baby Tad Script | |
| 1 Press On/Off button when in sleep mode | Hi!/I'm Baby Tad!/Let's sing!/(Plays one of the 6 songs at random; Then one of the shapes should light up/flash at random) | (Plays one of the 6 songs at random; Then one of the shapes should light up/flash at random for 5 seconds each) |
| 2 Press On/Off button when in wake mode | Bye-Bye! | |
| 3 Press Song button when in sleep mode | Hi!/I'm Baby Tad!/Let's sing!/(Plays one of the 6 songs at random; Then one of the shapes should light up/flash at random) | (Plays one of the 6 songs at random; Then one of the shapes should light up/flash at random for 5 seconds each) |
| 4 Press Star when in sleep mode | Hi!/I'm Baby Tad!/Yellow Star! | Yellow Star should flash as soon as child presses it through speech, then back to lighting game |
| 5 Press Circle when in sleep mode | Hi!/I'm Baby Tad!/Green Circle! | Green Circle should flash as soon as child presses it through speech, then back to lighting game |
| 6 Press Square when in sleep mode | Hi!/I'm Baby Tad!/Blue Square! | Blue Square should flash as soon as child presses it through speech, then back to lighting game |
| 7 Press Triangle when in sleep mode | Hi!/I'm Baby Tad!/Purple Triangle! | Purple Triangle should flash as soon as child presses it through speech, then back to lighting game |
| 8 Press Heart when in sleep mode | Hi!/I'm Baby Tad!/Red Heart! | Red Heart should flash as soon as child presses it through speech, then back to lighting game |
| 9 Press Diamond when in sleep mode | Hi!/I'm Baby Tad!/Orange Diamond | Orange Diamond should flash as soon as child presses it through speech, then back to lighting game |
| 11 Press Kiss when in sleep mode | Hi!/I'm Baby Tad!/("kiss" sfx)/I love you! | Heart should flash during speech |
| 12 After first 5 seconds of inactivity | ("giggle" sfx)/Let's play! | |
| 13 After second 5 seconds of inactivity | Peek-a-Boo! I see you! | |
| 14 | Pick up Baby Tad! | |
| 15 No activity at all for 18 seconds | Bye-Bye! [sleep mode] | |
| 16 Press lips | ("Kiss" sfx)/I love you! | Heart should flash during speech |
| 17 Press Star button when not lit | Yellow star! | Yellow Star should flash as soon as child presses it through speech, then back to lighting game |
| 18 Press Triangle button when not lit | Purple Triangle! | Purple Triangle should flash as soon as child presses it through speech, then back to lighting game |
| 19 Press Square button when not lit | Blue Square! | Blue Square should flash as soon as child presses it through speech, then back to lighting game |
| 20 Press Circle button when not lit | Green Circle! | Green Circle should flash as soon as child presses it through speech, then back to lighting game |
| 21 Press Diamond button when not lit | Red Heart! | Red Heart should flash as soon as child presses it through speech, then back to lighting game |
| 22 Press Diamond button when not lit | Orange Diamond! | Orange Diamond should flash as soon as child presses it through speech, then back to lighting game |
| 23 Press Song button for the first time in wake mode | Let's Sing!/(Plays 1 song at random while lights blink; cycles through songs in same order, one song per time song button is pressed; after song | |

TABLE 1-continued

| FUNCTION | RECORDING | LIGHTS |
|---|---|---|
| | finishes, 1 shape should light up/flash at random to begin game) | |
| 24 Press Song button when in wake mode (not first time) | (Plays 1 song at random while lights blink; cycles through songs in same order, one song per time song button is pressed; after song finishes, 1 shape should light up/flash at random to begin game) | (Plays 1 song at random while lights blink; cycles through songs in same order, one song per time song button is pressed; after song finishes, 1 shape should light up/flash at random to begin |
| 26 Press Star when Star is lit | Yay!/Yellow star!/(Twinkle, Twinkle song) | Yellow Star should flash as soon as child presses it through speech, then lights flash one at a time during song |
| 27 Press Triangle when Triangle is lit | Yay!/Purple Triangle/(Mary Had a Little Lamb song) | Purple Triangle should flash as soon as child presses it through speech, then lights flash one at a time during song |
| 28 Press Square when Square is lit | Yay!/Blue Square/(Itsy Bitsy Spider song) | Blue Square should flash as soon as child presses it through speech, then lights flash one at a time during song |
| 29 Press Heart when Heart is lit | Yay!/Red Heart/(Ring Around the Rosy) | Red Heart should flash as soon as child presses it through speech, then lights flash one at a time during song |
| 30 Press Circle when Circle is lit | Yay!/Green Circle/(Pat-A-Cake song) | Green Circle should flash as soon as child presses it through speech, then lights flash one at a time during song |
| 31 Press Diamond when Diamond is lit | Yay!/Orange Diamond/(If You're Happy) | Orange Diamond should flash as soon as child presses it through speech, then lights flash one at a time during song |
| 32 Note: During no activity or speech, shape buttons should light up/flash randomly, one at a time, and should remain lit for 5 seconds each time. | | |

BABY TAD SONGS

| | |
|---|---|
| Twinkle, Twinkle (yellow star) | (Sparkle sfx) Twinkle, twinkle, little star, how I wonder what you are. Up above the world so high. Like a diamond in the sky. Twinkle, twinkle, little star, how I wonder what you are. |
| Itsy, Bitsy Spider (blue square) | The Itsy, Bitsy Spider went up the water spout Down came the rain and washed the spider out. ("Falling" sfx) Out came the sun and dried up all the rain And the Itsy, Bitsy Spider went up the spout again. |
| Ring Around the Rosy (red heart) | Ring around the rosy, A pocket full of posy, Ashes, ashes, We all fall down! (New "Falling" sfx) |
| Pat-A-Cake (green circle) | Pat-a-Cake, Pat-a-Cake, bakers man, Bake me a cake as fast as you can. Roll it, pat it, and mark it with a B, And put it in the oven for baby and me. ("Baby goo goo, gah-gah" sfx) |
| Mary Had a Little Lamb (purple triangle) | Mary Had a Little Lamb, little lamb, little lamb Mary Had a Little Lamb, whose fleece was white as snow. And everywhere that Mary went, Mary went, Mary went And everywhere that Mary went, the lamb was sure to go ("Baah" sfx) |

Baby Tad Script

| | |
|---|---|
| If You're Happy (orange diamond) | If you're happy and you know it clap your hands, ("clap" sfx x2) If you're happy and you know it clap your hands, ("clap" sfx x2) If you're happy and you know it, then your face will surely show it, If you're happy and you know it clap your hands, ("clap" sfx x2) |

In summary, the inventive educational toy and method, combines several different instructional modalities that can be selected at the will of the player. The different modalities use proven pedagogical instruction modalities: declarative audial instruction reinforced by kinesthetic activity; use of hand-eye coordination rewarded by song; teaching that two different parameters, such as color or shape can be used to correctly name an object; a social function such as associating a kiss with "I love you"; and the presentation of melody and rhythm, through song, to aid in teaching via the use songs as a reward for pressing the flashing shape. The present inventive toy fills a child's need for a simple plush toy and also teaches by both making an assertion, or declaration, in response to an indication by the player ("orange diamond"), creating an association by flashing a light on the symbol the child chooses or rewarding the child if the child chooses the symbol with the flashing light, and by letting a child choose a song by pressing the appropriate note symbol.

The description of illustrative embodiments and best modes of the present invention is not intended to limit the scope of the invention. Various modifications, alternative constructions and equivalents may be employed without departing from the true spirit and scope of the appended claims.

I claim:

1. An interactive learning device comprising:
   a) the learning device in the form of a figure having an exterior surface, and wherein the figure is a plush animal having hands and feet;
   b) indicia on the exterior surface of the figure;
   c) at least one light associated with the indicia;
   d) switching circuitry coupled to the indicia;
   e) a speaker;
   f) a sound synthesizer;
   g) a logic circuit having at least one memory, input terminals that are electrically coupled to the switching circuitry, and output terminals electrically coupled to the sound synthesizer and the speaker;
   h) a plurality of preprogrammed instruction modalities stored in the at least one memory, wherein the plurality of preprogrammed instruction modalities include at least two distinct instruction modalities comprising (i) a first preprogrammed instruction modality that provides a visual stimulus that automatically moves from indicium to indicium and then provides a response for successful kinesthetic action by a user to the visual stimulus, and (ii) a second preprogrammed instruction modality that includes declaratory instruction,
      wherein the logic circuit controls interaction between the switching circuitry and the plurality of preprogrammed instruction modalities.

2. The device of claim 1 wherein the second preprogrammed instruction modality comprises declaring the colors of the indicia.

3. The device of claim 1 wherein the second preprogrammed instruction modality comprises declaring the names of the shapes of the indicia.

4. The device of claim 1 wherein the response for successful kinesthetic action comprises a song.

5. The device of claim 1 wherein the visual stimulus automatically and randomly moves from indicium to indicium.

6. The device of claim 1 wherein the indicia are located on the hands of the animal.

7. The device of claim 1 wherein the indicia are located on a chest of the animal.

8. The device of claim 1 wherein the at least two distinct instruction modalities further comprises a third preprogrammed instruction modality wherein the user may select songs.

9. The device of claim 1 wherein the indicia comprise colors or shapes.

10. The device of claim 1 wherein the indicia comprise shapes and colors.

11. The device of claim 1 wherein some of the indicia are coupled to switches that select an operative instructional modality.

12. The device of claim 1 wherein the logic circuit comprises a microprocessor.

13. A plush toy having an exterior and an interior surface, the plush toy comprising:
   a) indicia on the exterior surface of the plush toy, wherein the indicia comprise a plurality of shapes;
   b) switching circuitry coupled to the indicia;
   c) at least one light associated with the indicia;
   d) a sound synthesizer;
   e) a speaker;
   f) a logic circuit comprising a microprocessor and a memory, the logic circuit having input terminals electrically coupled to the switching circuitry and output terminals electrically coupled to the sound synthesizer and the speaker;
   g) means for declaring the names of the shapes;
   h) means for (i) providing a visual stimulus that automatically moves from shape to shape, (ii) allowing a user to respond by pressing one of the shapes while the visual stimulus automatically moves from shape to shape, and then (iii) providing appropriate feedback to the user as a function of the user's response to the visual stimulus; and
   i) means for allowing a user to select a song from among a plurality of songs stored in the memory.

14. The device of claim 13 wherein the visual stimulus automatically and randomly moves from shape to shape.

15. The device of claim 13 wherein the indicia comprise letters.

16. The device of claim 13 wherein the indicia comprise numbers.

17. The device of claim 13 wherein the indicia comprise shapes.

18. The device of claim 13 wherein the indicia are colored or patterned.

19. The device of claim 13 wherein the indicia comprise letters, numbers, shapes, and colors.

20. An interactive learning device comprising:
   a) a figure having an exterior surface, and wherein the figure is a plush animal having a chest, hands and feet;
   b) indicia on the chest of the figure;
   c) switching circuitry coupled to the indicia;
   d) a sound synthesizer;
   e) a speaker;
   f) a memory;
   g) a plurality of preprogrammed instruction modalities in the memory, wherein the plurality of preprogrammed instruction modalities comprises a first preprogrammed instruction modality comprising quizzing and a second preprogrammed instruction modality comprising declaratory instruction; and
   h) a logic circuit having a microprocessor, input terminals that are electrically coupled to the switching circuitry, and output terminals electrically coupled to the sound synthesizer and the speaker,
      wherein the logic circuit controls interaction between the switching circuitry and the plurality of preprogrammed instruction modalities.

21. The interactive learning device of claim 20 wherein the indicia comprise a plurality of letters.

22. The interactive learning device of claim 20 wherein the indicia comprises a plurality of shapes, and wherein the interactive learning device further comprises:
   a plurality of lights respectively associated with the plurality of shapes; and a third preprogrammed instruction modality that (i) provides a visual stimulus that is initiated by the plush toy and includes a light that flashes from shape to shape, (ii) waits and allows the user to respond by pressing one of the shapes while a light flashes from shape to shape, and then (iii) produces a response for the user if the user selects the shape associated with the light.

23. The interactive learning device of claim 20 wherein the response comprises a reward in the form of a song.

24. The interactive learning device of claim 20 wherein the light flashes from shape to shape in a random sequence.

25. The interactive learning device of claim 20 wherein the toy is capable of automatically turning off after being turned on if there is no interaction with the plush toy after a period of time.

26. The interactive learning device of claim 20 wherein each indicium of the indicia comprises a different shape and a different color.

27. The interactive learning device of claim 1 wherein the plush toy is capable of automatically turning off after being turned on if there is no interaction with the plush toy after a period of time.

28. The interactive learning device of claim 36 wherein the indicia comprise letters.

29. The interactive learning device of claim 20 wherein the indicia comprise shapes.

30. The interactive learning device of claim 20 wherein the interactive learning device is in the form of a cartoon character.

31. The interactive learning device of claim 20 wherein the indicia comprise numbers.

32. The interactive learning device of claim 20 further comprising indicia on the hands.

33. The interactive learning device of claim 20 further comprising a third preprogrammed instruction modality in the memory, wherein the third preprogrammed instruction modality comprises songs.

34. The interactive learning device of claim 33 wherein the indicia comprise letters.

35. The interactive learning device of claim 33 wherein the indicia comprise shapes.

36. An interactive learning device comprising:
   a) a figure having an exterior surface, and wherein the figure is a plush animal having hands and feet;
   b) indicia on the chest of the figure;
   c) switching circuitry electrically coupled to the indicia;
   d) a sound synthesizer;
   e) a speaker;
   f) a logic circuit having a microprocessor and a memory, input terminals that are electrically coupled to the switching circuitry, and output terminals electrically coupled to the sound synthesizer and the speaker;
   g) means for quizzing a user; and
   h) means for providing declaratory instruction to a user.

37. The interactive learning device of claim 36 further comprising:
   j) means for (i) providing a visual stimulus that is initiated by the plush toy and includes a light that flashes from indicium to indicium, (ii) waiting and allowing the user to respond by pressing one of the indicia while a light flashes from indicium to indicium, and then (iii) producing a response for the user if the user selects the indicium associated with the light.

38. The interactive learning device of claim 37 wherein the light automatically and randomly flashes from indicium to indicium.

39. The interactive learning device of claim 36 wherein the interactive learning device is in the form of a cartoon character.

40. The interactive learning device of claim 36 wherein the indicia comprise numbers.

41. The interactive learning device of claim 36 further comprising indicia on the hands.

42. The interactive learning device of claim 36 further comprising means for playing songs.

43. The interactive learning device of claim 42 wherein the indicia comprise letters.

44. The interactive learning device of claim 42 wherein the indicia comprise shapes.

* * * * *

UNITED STATES PATENT AND TRADEMARK OFFICE
CERTIFICATE OF CORRECTION

PATENT NO.    : 6,463,257 B1  Page 1 of 1
DATED         : October 8, 2002
INVENTOR(S)   : Michael C. Wood It is certified that error appears in the above-identified patent and that said Letters Patent is hereby corrected as shown below:

<u>Title page,</u>
Item [73], Assignee, please delete "Knowledge Kids Enterprises, Inc.," and insert -- LeapFrog Enterprises, Inc.
    Emeryville, CA --.

Signed and Sealed this

Twenty-ninth Day of April, 2003

JAMES E. ROGAN
*Director of the United States Patent and Trademark Office*